United States Patent
van Rensburg et al.

(10) Patent No.: US 12,212,613 B2
(45) Date of Patent: Jan. 28, 2025

(54) METHOD AND SYSTEM FOR ADJUSTING SHARED CONTENT

(71) Applicant: RingCentral, Inc., Belmont, CA (US)

(72) Inventors: Christopher van Rensburg, Portland, OR (US); Kirill Konshin, Daly City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/869,445

(22) Filed: Jul. 20, 2022

(65) Prior Publication Data
US 2024/0031416 A1    Jan. 25, 2024

(51) Int. Cl.
*G06F 15/16* (2006.01)
*H04L 65/403* (2022.01)

(52) U.S. Cl.
CPC ................... *H04L 65/403* (2013.01)

(58) Field of Classification Search
CPC ..................................... H04L 65/403
USPC .................................. 709/204, 205
See application file for complete search history.

(56) References Cited

U.S. PATENT DOCUMENTS

| | | | |
|---|---|---|---|
| 9,996,367 B1* | 6/2018 | Bao | G06F 3/14 |
| 2004/0024819 A1* | 2/2004 | Sasaki | H04L 12/1813 |
| | | | 709/205 |
| 2006/0031779 A1* | 2/2006 | Theurer | G06F 3/1454 |
| | | | 715/781 |
| 2016/0241672 A1* | 8/2016 | Fried | H04L 51/56 |
| 2022/0414241 A1* | 12/2022 | Chittampally | G09G 5/00 |

FOREIGN PATENT DOCUMENTS

| | | | | |
|---|---|---|---|---|
| CN | 106325666 B | * | 11/2019 | |
| CN | 111596985 A | * | 8/2020 | G06F 9/451 |
| KR | 20090097111 A | * | 9/2009 | G06F 9/00 |

* cited by examiner

*Primary Examiner* — Liang Che A Wang (57) ABSTRACT

A computer-implemented method for adjusting content shared during communication sessions, comprising: obtaining, through a first device, a content to share, determining a primary portion of the content to share, adjusting the content to share based on the primary portion to generate a first adjusted content to share and causing the first adjusted content to share to be displayed on a second device.

20 Claims, 6 Drawing Sheets

METHOD AND SYSTEM FOR ADJUSTING SHARED CONTENT

TECHNICAL FIELD

The present disclosure relates generally to the field of sharing during a communication session. Specifically, the present disclosure relates to systems and methods for adjusting content to share during a communication session based on a determined portion to share.

BACKGROUND

Communication sessions, such as audio and/or video conference calls, have gained significant popularity during the last several years as a communication tool and as a business collaboration tool with the rise of a global pandemic and the increased need for remote work.

When screen sharing during a communication session, a participant sharing their screen may be given a choice to share their entire desktop screen or one of their application windows. Regardless of what the participant chooses, there are multiple layers of controls or other portions of the screen that are visualized and displayed. For example, in the case of a shared application, there is the title bar, main menu, edit view toolbar, navigation pane, add-ons pane, etc. In the case of a shared desktop, there may be different windows open on the entire desktop screen, including a window frame, a window title bar, browser tabs, browser toolbar/location bar, bookmarks bar, etc. Not only does this clutter the visuals of the shared screen by making the critical portions difficult to see, but it also wastes bandwidth by sharing extraneous visuals.

SUMMARY

The appended claims may serve as a summary of the invention.

DETAILED DESCRIPTION

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood that terms "user" and "participant" have equal meaning in the following description.

"Communication session" means, without limitation, two or more people communicating using audio and/or video communication means through any type of user device or virtual reality techniques, any type of webinar or any type of podcast or any type of recorded video/audio stream.

In one embodiment, a computer-implemented method for adjusting content shared during communication sessions, comprising: obtaining, through a first device, a content to share, determining a primary portion of the content to share, adjusting the content to share based on the primary portion to generate a first adjusted content to share and causing the first adjusted content to share to be displayed on a second device.

In another embodiment, a system for adjusting content shared during communication sessions comprises a memory storing a set of instructions and at least one processor configured to execute the instructions to: obtain, through a first device, a content to share, determine a primary portion of the content to share, adjust the content to share based on the primary portion to generate a first adjusted content to share and cause the first adjusted content to share to be displayed on a second device.

In yet another embodiment, a web-based server for adjusting content shared during communication sessions comprises a memory storing a set of instructions and at least one processor configured to execute the instructions to: obtain, through a first device, a content to share, determine a primary portion of the content to share, adjust the content to share based on the primary portion to generate a first adjusted content to share and cause the first adjusted content to share to be displayed on a second device.

Figure 1:
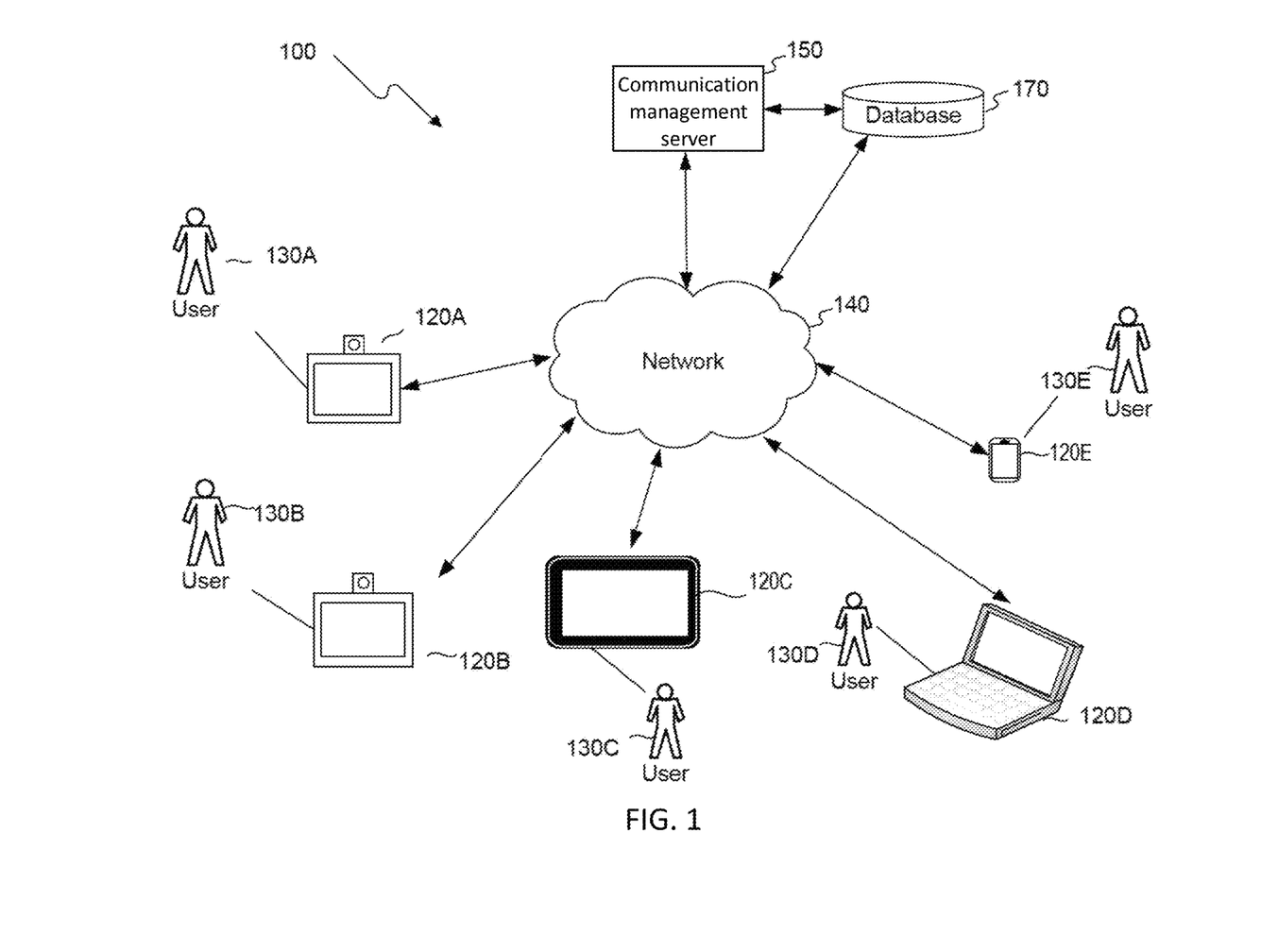
FIG. 1 is a diagram of a communication system, in accordance with some embodiments of the present disclosure.

FIG. 1 shows an example of a conference management system 100 in which various implementations as described herein may be practiced. Communication management system 100 may enable a plurality of users to schedule communication sessions, run communication sessions, share content during communication sessions and record communication sessions. In some examples, one or more components of communication management system 100, such as communication management server 150, can be used to implement computer programs, applications, methods, processes, or other software to perform the described techniques and to realize the structures described herein.

As shown in FIG. 1, communication management system 100 may include one or more user devices 120A-120E (collectively, referred to as user devices 120), a network 140, a communication management server 150, and a database 170. The components and arrangements shown in FIG. 1 are not intended to limit the disclosed embodiments, as the system components used to implement the disclosed processes and features can vary.

The network 140 may facilitate communications and sharing of communication session content and media between user devices 120 (some or all) and the communication management server 150. The network 140 may be any type of network that provides communications, exchanges information, and/or facilitates the exchange of information between the communication management server 150 and user devices 120. For example, the network 140 may be the Internet, a Local Area Network, a cellular network, a public switched telephone network ("PSTN"), or other suitable connection(s) that enables communication management system 100 to send and receive information between the components of communication management system 100. A network may support a variety of electronic messaging formats and may further support a variety of services and applications for user devices 120.

The communication management server 150 can be a computer-based system including computer system components, desktop computers, workstations, tablets, hand-held computing devices, memory devices, and/or internal network(s) connecting the components. The communication management server 150 may be configured to provide communications sessions, such as setting up communication sessions for users 130A-130E. The communication management server 150 may be configured to receive information from user devices 120 over the network 140, process the information, store the information, manipulate the information and/or transmit communication session information to the user devices 120 over the network 140. For example, the communication management server 150 may be configured to analyze a content to share, images, video signals, and audio signals sent by users 130A-130E and adjust the content to share to show only primary portion to the participants. The communication management server 150 may store adjustment settings for the content to share of the communication session in database 170. In another embodiment the communication management server 150 may store a full recording of the communication session including areas that were removed from the original content to share to create the adjusted content to share.

In some implementations, the functionality of the communication management server 150 described in the present disclosure is distributed among one or more of the user devices 120A-120E. For example, one or more of the user devices 120A-120E may perform functions such as adjusting content to share of the communication session or storing a full recording of the communication session including areas that were removed from the original content to share to create the adjusted content to share.

The database 170 may include one or more physical or virtual storages coupled with the communication management server 150. The database 170 may be configured to store communications session information received from user devices 120, profiles of the users 130 such as contact information and images of the users 130, recording of the communication session, information about determined primary portion of a content to share and adjustment settings for the content to share of the communication session. The database 170 may further include images, audio signals, and video signals received from the user devices 120. The data stored in the database 170 may be transmitted to the communication management server 150 for analysis and adjustment of the content to share of the communication session. In some embodiments, the database 170 is stored in a cloud-based server (not shown) that is accessible by the communication management server 150 and/or the user devices 120 through the network 140. While the database 170 is illustrated as an external device connected to the communication management server 150, the database 170 may also reside within the communication management server 150 as an internal component of the communication management server 150.

As shown in FIG. 1, users 130A-130E may communicate with communication management server 150 using various types of user devices 120A-120E via network 140. As an example, user devices 120A, 120B, and 120D may include a display such as a television, tablet, computer monitor, video conferencing console, or laptop computer screen. User devices 120A, 120B, and 120D may also include video/audio input devices such as a video camera, web camera, or the like. As another example, user devices 120C and 120E may include mobile devices such as a tablet or a smartphone having display and video/audio capture capabilities. User devices 120A-120E may also include one or more software applications that facilitate the user devices to engage in communications, such as IM, text messages, EMAIL, VoIP, video conferences, with one another.

Figure 2:
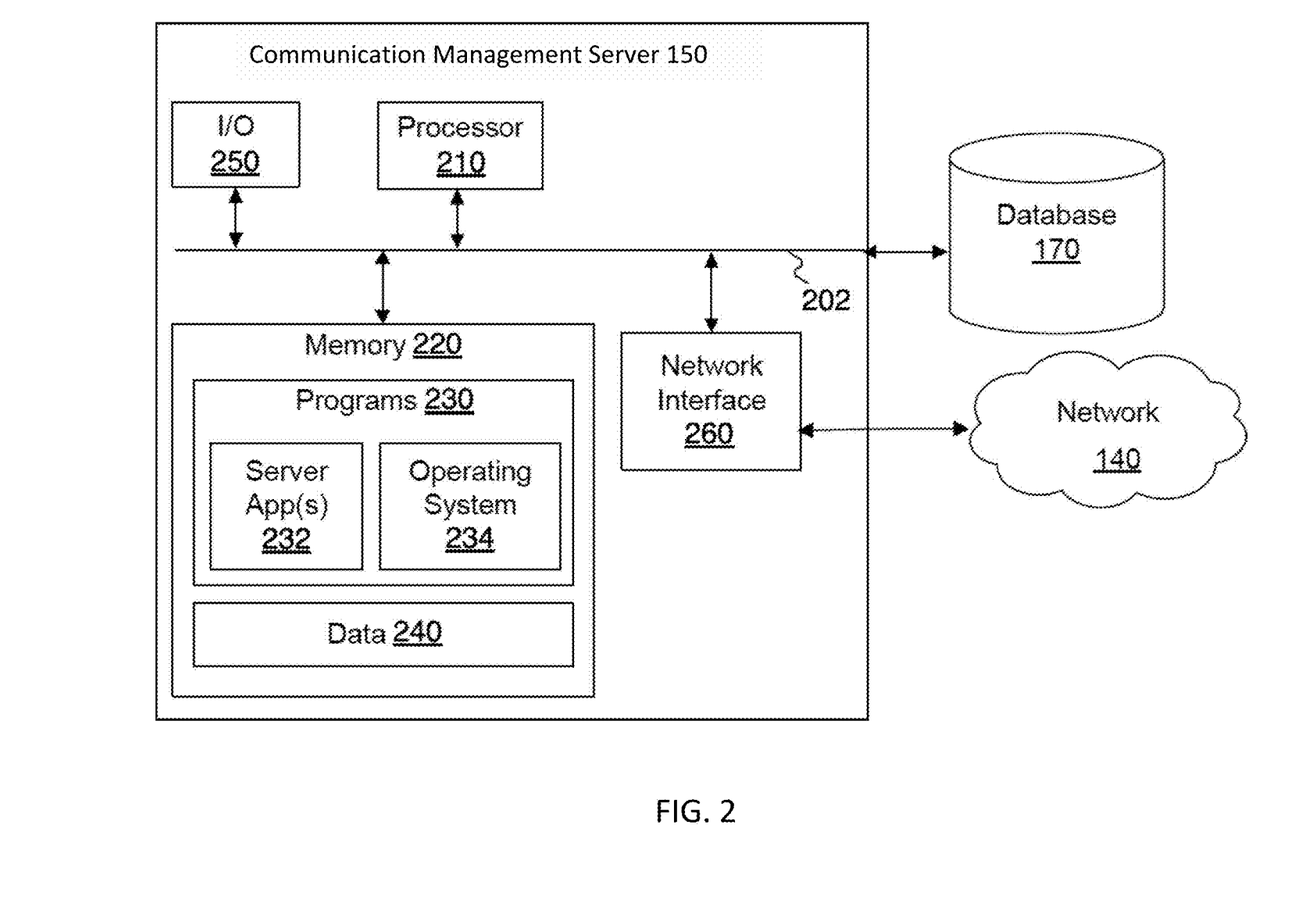
FIG. 2 is a diagram of a server, in accordance with some embodiments of the present disclosure.

FIG. 2 shows a diagram of an example communication management server 150, consistent with the disclosed embodiments. The communication management server 150 may include a bus 202 (or other communication mechanism) which interconnects subsystems or components for transferring information within the communication management server 150. As shown, the communication management server 150 may include one or more processors 210, input/output ("I/O") devices 250, network interface 260 (e.g., a modem, Ethernet card, or any other interface configured to exchange data with the network 140), and one or more memories 220 storing programs 230 including, for example, server app(s) 232, operating system 234, and data 240, and can communicate with an external database 170 (which, for some embodiments, may be included within the conference management server 150). The communication management server 150 may be a single server or may be configured as a distributed computer system including multiple servers, server farms, clouds, or computers that interoperate to perform one or more of the processes and functionalities associated with the disclosed embodiments.

The processor 210 may be one or more processing devices configured to perform functions of the disclosed methods, such as a microprocessor manufactured by Intel™ or manufactured by AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the communication management server 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Common forms of non-transitory media may include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication management server 150 may include one or more storage devices configured to store information used by processor 210 (or other components) to perform certain functions related to the disclosed embodiments. For example, the communication management server 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the communication management server 150) or external storage communicatively coupled with the communication management server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication management server 150 may be communicatively connected to one or more remote memory devices (e.g., remote databases (not shown)) through network 140 or a different network. The remote memory devices can be configured to store information that the communication management server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 230 may include one or more software modules configured to cause processor 210 to perform one or more functions consistent with the disclosed embodiments. Moreover, the processor 210 may execute one or more programs located remotely from one or more components of the communication management system 100. For example, the communication management server 150 may access one or more remote programs that, when executed, perform functions related to disclosed embodiments.

In the presently described embodiment, server app(s) 232 may cause the processor 210 to perform one or more functions of the disclosed methods. For example, the server app(s) 232 may cause the processor 210 to receive a content to share during a communication session, such as audio, video, media and any other content sent by one or more users, determine a primary portion of the content to share and adjust the content to share to show only the primary portion of the content to share. In some embodiments, other components of the communication management system 100 may be configured to perform one or more functions of the disclosed methods. For example, user devices 120A-120E may be configured to determine a primary portion of the content to share and adjust content to share to show only the primary portion of the content.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 234. The communication management server 150 may also include software that, when executed by a processor, provides communications with the network 140 through the network interface 260 and/or a direct connection to one or more user devices 120A-120E.

In some embodiments, the data 240 may include conference audio, video and content to share received from user devices 120. Data 240 may further include communication session context. For example, data 240 may comprise the communication session recording and a transcription of the communication session recording. Further, data 240 may include data used for analyzing and determining a primary portion of the content to share of the communication session, such as key words, phrases, video feed or Machine Learning (ML) training data.

The communication management server 150 may also include one or more I/O devices 250 having one or more interfaces for receiving signals or input from devices and providing signals or output to one or more devices that allow data to be received and/or transmitted by the communication management server 150. For example, the communication management server 150 may include interface components for interfacing with one or more input devices, such as one or more keyboards, mouse devices, and the like, that enable the communication management server 150 to receive input from an operator or administrator (not shown).

Figure 3:
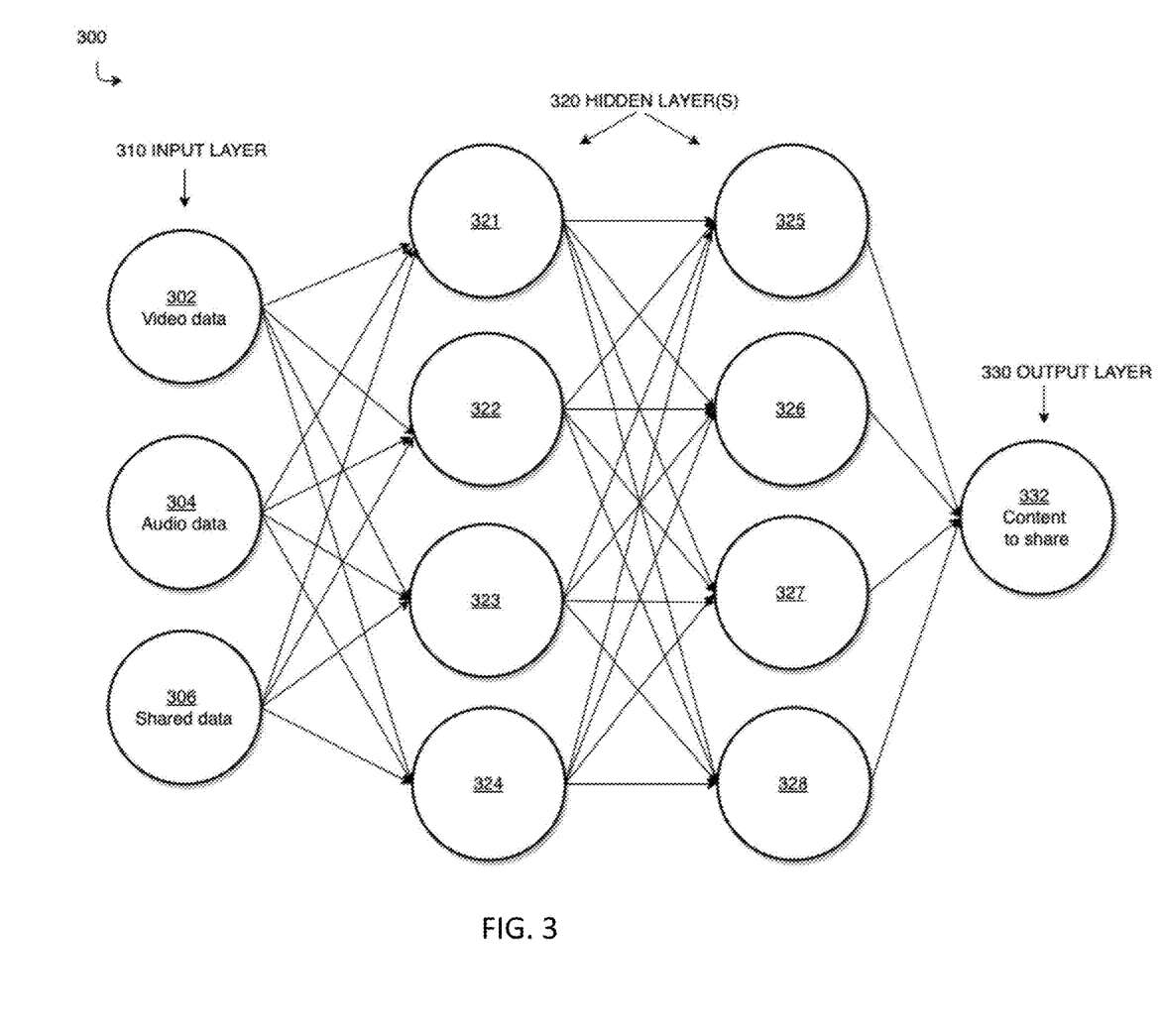
FIG. 3 is a diagram of Machine Learning (ML) technique in accordance with some embodiments of the present disclosure.

In an embodiment, Machine Learning (ML) techniques may be used to train the communication management server 150 to determine a primary portion of the content to share of the communication session. Referring to FIG. 3, a neural network 300 may utilize an input layer 310, one or more hidden layers 320, and an output layer 330 to train a machine learning algorithm or model to detect the primary portion of the content to share during the communication session. In some embodiments, where the primary portion of the content to share during the communication session is confirmed, supervised learning is used such that known input data, a weighted matrix, and known output data is used to gradually adjust the model to accurately compute the already known output. In other embodiments, where the primary portion of the content to share of the communication session are not confirmed, unstructured learning is used such that a model attempts to reconstruct known input data over time in order to learn.

Training of the neural network 300 using one or more training input matrices, a weight matrix and one or more known outputs may be initiated by one or more computers associated with the communication management server 150. For example, the communication management server 150 may be trained by one or more training computers and, once trained, used in association with the user devices 120. In an embodiment, a computing device may run known input data through a deep neural network 300 in an attempt to compute a particular known output. For example, a server computing device uses a first training input matrix and a default weight matrix to compute an output. If the output of the deep neural network does not match the corresponding known output of the first training input matrix, the server may adjust the weight matrix, such as by using stochastic gradient descent, to slowly adjust the weight matrix over time. The server computing device then may re-compute another output from the deep neural network with the input training matrix and the adjusted weight matrix. This process may continue until the computer output matches the corresponding known output. The server computing device then may repeat this process for each training input dataset until a fully trained model is generated.

In the example of FIG. 3, the input layer 310 may include a plurality of training datasets that are stored as a plurality of training input matrices in an associated database, such as database 170 of FIG. 1. The training input data may include, for example, video data 302, audio data 304 and shared data 306. Video data 302 may be input data related to any video related media from the conference, such as traditional video feed, 3D visualization, augmented reality, virtual reality etc. Audio data 304 may be input data related to any audio related communication session media data, such as audio feed. Shared data 306 may relate to any types of files or applications or other data shared during the communication session by any participant using video feed or the communication session integrated chat functionality, if any, and may include presentation, images, videos, applications and other possible pieces of information that one participant can share with at least one another participant during the communication session. While the example of FIG. 3 uses a single neural network, in some embodiments, separate neural networks 300 would be trained to identify the primary portion of the content to share of the communication session from each of the different types of input data. For example, one neural network 300 would be trained to identify the primary portion of the content to share strictly from video data 302, another neural network 300 would be trained to identify the content to share from the audio data 304, another neural network 300 would be trained to identify the content to share from the shared data 306. Any number of neural networks, in any combination, may be used to train the communication management server 150 to identify the content to share.

In the embodiment of FIG. 3, hidden layers 320 may represent various computational nodes 321, 322, 323, 324, 325, 326, 327, 328. The lines between each node 321, 322, 323, 324, 325, 326, 327, 328 may represent weighted relationships based on the weight matrix. As discussed above, the weight of each line may be adjusted overtime as the model is trained. While the embodiment of FIG. 3 may feature two hidden layers 320, the number of hidden layers is not intended to be limiting. For example, one hidden layer, three hidden layers, ten hidden layers, or any other number of hidden layers may be used for a standard or deep neural network. The example of FIG. 3 may also feature an output layer 330 with the content to share 332 as the known output. The content to share 332 may indicate the primary portion of the content to share during the conference session. As discussed above, in this structured model, the content to share 332 may be used as a target output for continuously adjusting the weighted relationships of the model. When the model successfully outputs the content to share 332, then the model has been trained and may be used to process live or field data.

Once the neural network 300 of FIG. 3 is trained, the trained communication management server 150 may accept field data at the input layer 310, such as the video data 302, audio data 304, shared data 306. In some embodiments, the field data is live data that is accumulated in real time, such as a live streaming video and audio of the communication session. In other embodiments, the field data may be current data that has been saved in an associated database, such as database 170. The trained communication management server 150 may be applied to the field data in order to identify the content to share at the output layer 330. For instance, a trained communication management system 150 can identify the primary portion of the content to share during the communication session.

Figure 4:
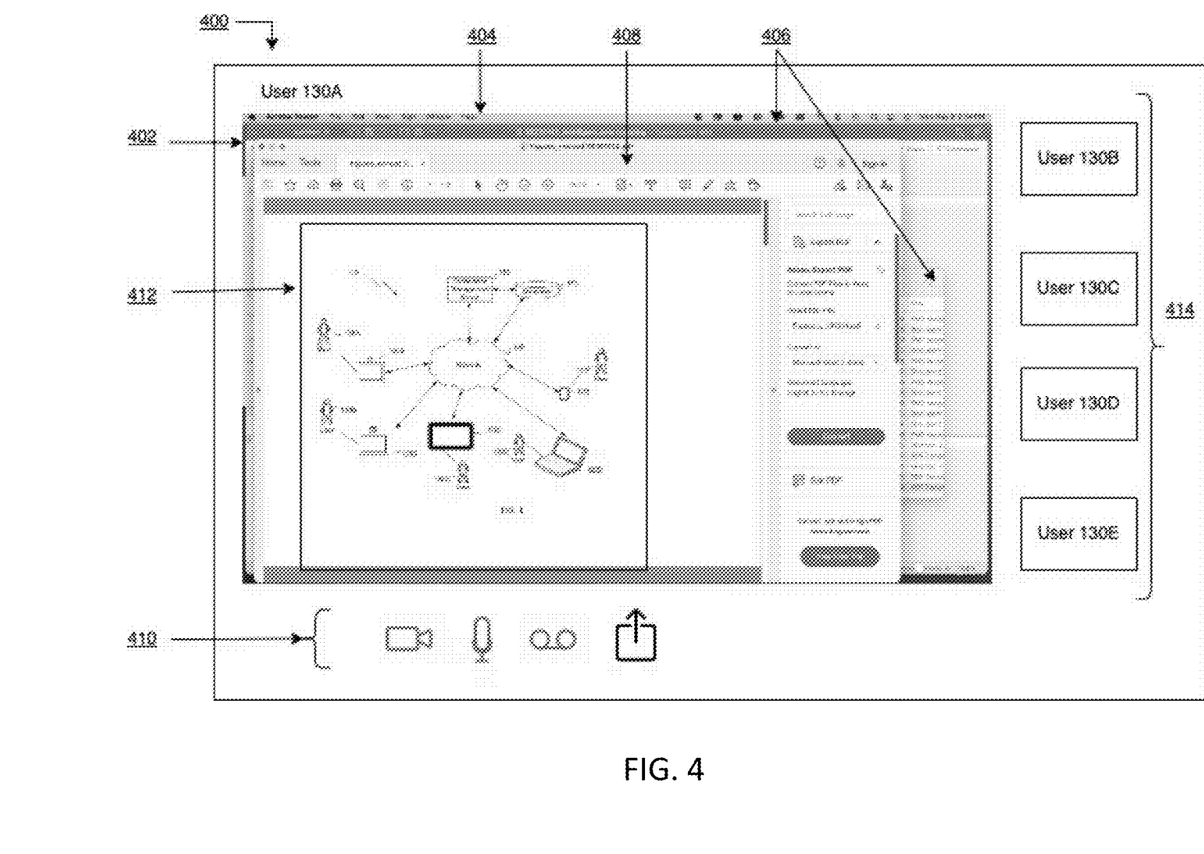
FIG. 4 is a User Interface (UI), in accordance with some embodiments of the present disclosure.

FIG. 4 depicts a user interface (UI) 400. The UI 400 can be located on a User device 120A of a User 130A. UI 400 may display a communication session conducted between Users 130A-130E that includes video communication. UI 400 may comprise a list of users 414 showing other participants of the communication session, such as User 130B, User 130C, User 130D and User 130E in this example. UI 400 may comprise control functions 410 for the communication session, including video control function, audio control function, recording control function and share control function. While FIG. 4 may depict specific control functions 410, they are for example purposes and are not intended to be limiting.

In one embodiment of the present disclosure, one of the users intends to share specific content during the communication session. For example, the User 130B wants to share a diagram 412 with other participants of the communication session. To share this diagram 412, User 130B may share his entire screen 402, resulting in a display of a variety of other applications and extraneous information that do not relate to diagram 412, which is the primary focus of the content that User 130B intends to share. In this example, the entire shared screen displays an Operating System (OS) toolbar 404, additional application windows 406, and control functions 408 of an application that is used to display the primary portion of the content that is shared.

In one embodiment, a communication management server 150 determines the primary portion of the content to share based on a type of an active application. In this example, the communication management server 150 determines that an Adobe Acrobat® Reader window is active. The communication management server 150 can determine, from a database 170 or an Internet search for example, information about this particular active application, such as what toolbars it comprises, what control functions are present, what the general parts of the active application are and what area shows the primary portion, or relevant portion, of the content that is to be shared. Primary portion of the content to share may be a part of a shared screen that the participant intends to share with other participants and that reflects a content of a discussion during the communication session.

In the FIG. 4 example, based on the obtained information, the communication management server 150 may determine that the primary portion of the content to share is the diagram 412 that is located in the area of the active application that is intended to display substantive content.

In another embodiment the communication management server 150 can determine different types of active applications, for example web browsers, Microsoft Office applications, video applications, presentation applications, virtual reality (VR) or augmented reality (AR) applications, and all other applications.

In another embodiment, the communication management server 150 can perform a recursive process of analyzing the content to share in order to determine an area of the primary portion of the content to share. This process may involve technologies of Computer Vision or other techniques of Artificial Intelligence, some of which techniques may involve the use of Machine Learning as described in FIG. 3.

The recursive process may involve, for each iteration of recursion, performing analysis to determine a portion of the content to share. That portion may be, for example, a toolbar, an additional application window or control functions of an application and/or some substantive or relevant part of the content to share.

For example, upon initial analysis of the content to share, the conference management server 150 may determine that a Web browser application with multiple tabs, one of which is active, should be shared. The conference management server 150 may further identify the particular type of Web browser application (e.g., Google Chrome, Microsoft Edge, Mozilla Firefox, Apple Safari, etc.) based on the information retrieved from the database 170.

Upon determining the type, software vendor or manufacturer, version, etc. of the Web browser application in the content to share, the conference management server 150 may then retrieve from the database 170 a structural model of the identified Web browser application that has information about the application's control functions (e.g., window frame, window title bar, browser tabs, browser toolbar/ location bar, bookmarks bar, etc.) and an area of the Web browser application that can be considered the primary portion of the content to share. In this example, an active web page of the Web browser application may be determined by the conference management server 150 as the primary portion of the content to share.

In another embodiment, the conference management server 150 can repeat actions described above for the primary portion of the content to share to determine if the content to share can or should be adjusted further. For example, if the active web page of the Web browser application page is a slide set document that is loaded into the Google Slides Web application, the conference management server 150 may determine control functions of Google Slides Web application on a second round of analysis and retrieve a structure model for the Google Slides Web application that has information about application control functions (e.g., an application's title bar, an application's main menus, an edit view toolbar, a slides navigation left pane, an application add-ons right pane, etc.) and the primary portion of the content to share. In this particular example, slides from the Google Slides Web application may be determined as the primary portion of the content to share on a second iteration of the recursive process.

In another example, a third round of the analysis can be executed by the conference management server 150 that may determine that there is no match to any structural model of an application. At this point, the recursive process may terminate and adjust the content to share based on determined primary portion of the content to share from the previous iteration(s).

In another embodiment, the conference management server 150 may represent the primary portion to a participant who shares the content. Representation may take the form of a rectangular highlight, for example, that is displayed as an overlay in a screen of the participant who shares the content through the participant's computing device. The participant may apply the system's suggested determination of the primary portion of the content to share or manually change it. In some embodiments, the conference management server 150 can adjust the content to share based on the participant's input.

In yet another embodiment, representation of the primary portion of the content to share may be displayed to a participant other than the participant who shares the content and the content for sharing can be adjusted based on an input from the participant other than the participant who shares the content. Adjustments may be participant-specific and applied individually to the device associated with the participant, resulting in different displays for each participant. For example, participants other than the sharing participant may adjust the primary portion of the content to share based on their own inputs to be displayed on their own devices. For example, User 130A who is not sharer of the content can adjust the content that is displayed on their own Device 120A based on a primary portion of the content to share that is determined by Device 120A. Simultaneously, User 130C can adjust the content differently for display through Device 130C based on the primary portion of the content to share that is determined by Device 120C.

In yet another embodiment, the conference management server 150 can determine other non-substantive content that is displayed on the shared screen. For example, the conference management server 150 can determine inactive application windows 406 that are displayed behind the active window. Additionally, the conference management server 150 can determine other parts of the shared screen, such as the OS toolbar 404.

In another embodiment, the conference management server 150 can determine that the primary portion of the content to share is located in an active application for which the conference management server 150 obtained the structure model. Moreover, the conference management server 150 may provide suggestions, tips or instructions to the participant who shares the content on how that participant may adjust the content to focus on the primary portion of the content to enhance the sharing experience. For example, if User 130B is sharing content, such as a Google Chrome Web browser window with an active browser tab that has a slide set loaded into the Google Slides application, the conference management server 150 may provide a suggestion to User 130B to enter presentation mode for the slide set. The suggestion can be in the form of a notification, pop up window or any other form. In some embodiments, the conference management server 150 provides the user with the exact commands to enhance the sharing experience or indicates the correct toggles on the screen to do so. In the example above, conference management server 150 may indicate to User 130B the key commands to enter presentation mode, or visually indicate the options on screen to do so.

In another embodiment, all techniques described above for the communication session are applicable to a webinar session, virtual reality session or any other session where one participant can share a content with other participants using any known technique.

Figure 5:
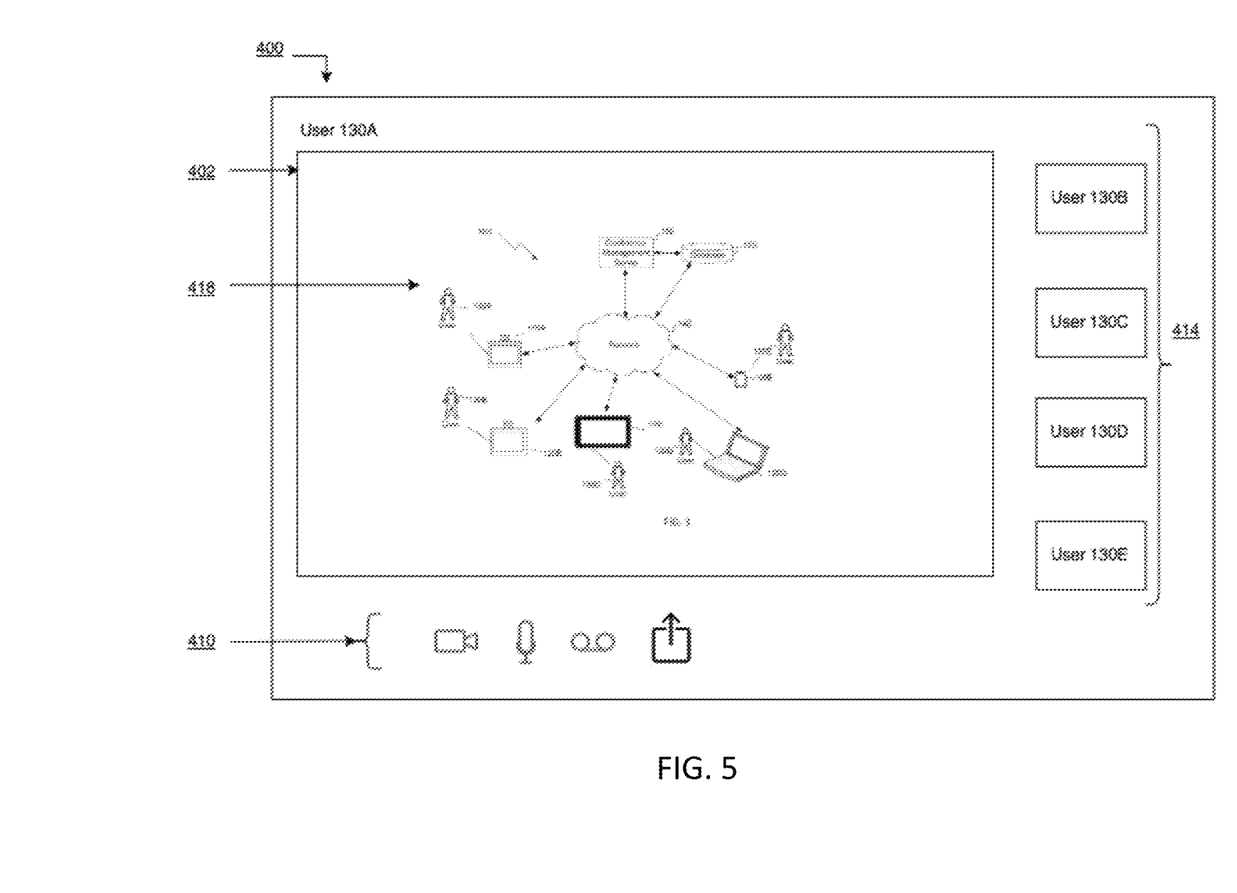
FIG. 5 is a UI, in accordance with some embodiments of the present invention.

FIG. 5 depicts a display screen and a user interface (UI) 400 displaying adjusted content to share. In one embodiment, after the conference management server 150 determines the primary portion of the content for sharing, it adjusts the content so that some or all other participants can see the primary portion of the content to share 418 without any irrelevant or technical information. In the example of FIG. 5, the conference management server 150 may determine that the diagram 412 is the primary portion of the content to share and may adjust the content to share to just the diagram 412 by cropping the entire shared screen of User 130B.

In other embodiments, different types of adjustments can be applied in order to emphasize the primary portion of the content to be shared. For example, the conference management server 150 can blur, darken, or color everything in User 130B's shared screen other than the primary portion. As another example, the conference management server 150 can enlarge the primary portion of the content to share such that the primary portion takes the whole screen.

Figure 6:
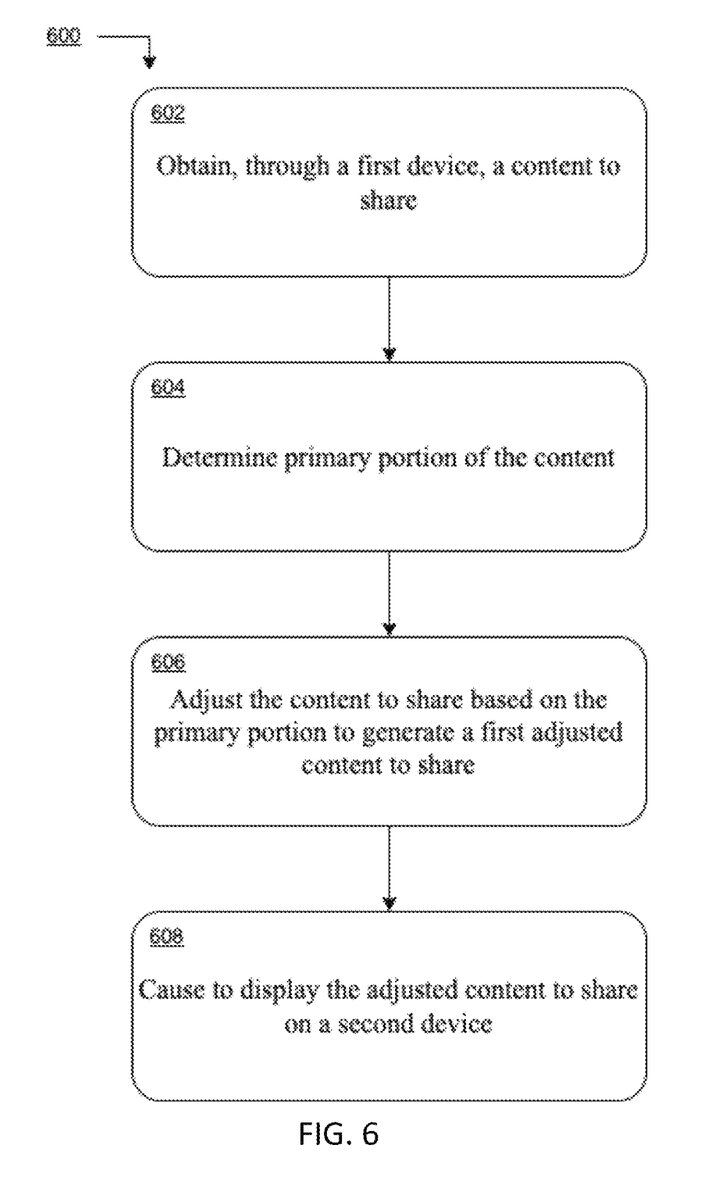
FIG. 6 is a flowchart of a method for adjusting content to share.

FIG. 6 depicts a flow chart of a method for communication. At step 602, a content to share is obtained through a first device. For example, a User 120B using User Device 130B wants to record a presentation and opens a content stored on the User Device 130B that is part of such presentation.

At step 604, a primary portion of the content to share is determined. For example, the User Device 130A determines the primary portion of the content to share using methods described above.

In another embodiment the conference management server 150 can determine the primary portion of the contact to share based an information received from the User Device 130B.

In another embodiment, the User Device 130B or conference management server 150 can use ML algorithms to determine the primary portion of the content to share. The ML algorithm can be based not only on video data but can comprise audio data. In one example, the ML algorithm obtains a screen of the User Device 130B that shows the content that User 120B opened and obtains audio input from the User 120B describing the content that is displayed on the screen of the User Device 130B. Audio data may be in text format after transcription executed by the User Device 130B or in audio format without any transcription. The ML algorithm may analyze audio data to determine if the primary portion of the content to share is correctly determined based on image data or any correction is needed based on audio data from the User 120B. For example, if User 130B describes a diagram displayed on the User Device 130B, then the primary portion of the content to share is the diagram, and the User Device 130B can adjust the primary portion of the content to share to the diagram. However, if the User 120B discusses the control functions of an active application that displays the diagram, the User Device 130B can adjust the primary portion of the content to share to the active application control functions and not the diagram itself, because the audio content of the communication session analyzed by the ML algorithm shows that participants are discussing the active application control functions rather than the diagram.

In another embodiment the ML algorithm obtains the entire screen 402 that the User 130B shares with other participants and obtains audio data 304 from all participants of the conference. Audio data may be in text format after transcription executed by the conference management server 150 or in audio format without any transcription. The ML algorithm may analyze audio data to determine if the primary portion of the content to share is correctly determined based on image data or any correction is needed based on audio data from the communication session. For example, if participants of the communication session discuss the diagram 412, then the primary portion of the content to share is the diagram 412, and the conference management server 150 can adjust the primary portion of the content to share to the diagram 412. However, if the participants of the communication session discuss the control functions of an active application that displays the diagram 412, the conference management server 150 can adjust the primary portion of the content to share to the active application control functions and not the diagram 412 itself, because the audio content of the communication session analyzed by the ML algorithm shows that participants are discussing the active application control functions rather than the diagram 412.

In yet another embodiment, different known techniques can be used by the ML algorithm to determine the primary portion of the content to share based on audio data, including key words determination.

At step 606, an adjustment of the content to share is executed based on a primary portion to generate a first adjusted content to share. For example, the User Device 130B or conference management server 150 adjusts the content to share based on a determination made by the ML algorithm and crops the content to share to the diagram 412 as the primary portion of the content to share.

At step 608, the adjusted content is caused to be displayed on a second device. For example, users, who may watch recorded presentation with the content to share after it was actually recorded at step 602 see the primary portion of the content to share after the User Device 130B adjusted it during the recording.

In another embodiment, the content to share is shared during a communication session where each user device displays only the diagram 412 as the primary portion of the content to share based on instructions received from the conference management server 150. All participants on their devices will see only diagram 412 instead of the full shared screen of Device 120B.

In another embodiment user devices associated with different users may be caused to display a different primary portion of the content to share based on user device determination described above.

In another embodiment, each device can execute steps 604-610 by itself without using the conference management server 150. For example, Device 120A can obtain the content to share, determine the primary portion of the content to share and adjust the content to share based on the primary portion of the content to share to display it to User 130A based on the method described in the FIG. 4.

In another embodiment, Device 130E can use a ML algorithm described in FIG. 3 to determine that the primary portion of the content to share is not only the diagram 412 but an active application that displays the diagram 412. For example, a ML algorithm may process audio data of the participants discussing overall functionality of the active application to determine that the primary portion of the content that should be shared encompasses both the diagram 412 and the active application that displays the diagram 412. In this example, Device 130B may adjust the content for sharing to the active application that displays the diagram 412, but not to diagram 412 alone.

In another embodiment, the method 600 may include a first step of establishing a communication session between two or more devices. This can be a video conference session, virtual reality conference session, augmented reality conference session, a webinar or any other type of communication session where participants can share any type of content with each other. A conference management server 150 can establish the communication session using network 140.

In another embodiment, the communication session can be a collaboration session within a chat service where users can share images In another embodiment, determination of the primary portion of the content to share can be done by a User Device that is not involved in any communication session or even has no internet or other network connection. For example, when the User 120A records a presentation for a webinar or any other event, User Device 130A may determine the primary portion of the content to share, where the content to share in this scenario may be any type of media that the User 120A wants to demonstrate to an audience along with verbal text. The primary portion of the content to share may be shown in a presentation recording instead of all the content, including extraneous content, which may or may not include a substantial portion of the overall content. After the User 120 completes the recording of the presentation it can be stored on any local media like hard drive, USB drive, etc. or uploaded to a network storage like Google Drive.

In another embodiment, another user, for example, User 120B, through his User Device 130B, can access the recording of the presentation and play it back on the User Device 130B. User 120B may access the recording any time after it was actually recorded. The recording may be transferred to the User Device 130B to be locally displayed on the User Device 130B.

In another embodiment, the recording may be broadcasted through a network to any number of recipients as a webinar or during a conferencing session any time after the recording was actually recorded. In some embodiments, the content of the recording may be adjusted such that the recording may comprise only the primary portion of the content to share notwithstanding what the User 120A had on the screen of the User Device 130A during the initial recording.

What is claimed is:

1. A computer-implemented method for adjusting content shared during communication sessions, comprising:
   obtaining, through a first device an application to share, wherein the application includes at least one or more control functions configured to control at least one aspect of the application, wherein the application has a first window size;
   determining a primary portion of the application to share automatically, wherein the primary portion is a subset portion of the application excluding the at least one or more control functions, and wherein the primary portion of the application includes a content to share, and wherein the primary portion has a second window size that is smaller than the first window size;
   cropping the application to exclude the at least one or more control functions and leaving only the content to be shared, wherein the cropping is based on the primary portion, and wherein the cropping changes a window size of the application from the first size to the second window size; and
   causing the content within the subset portion of the application to be shared and displayed on a second device.

2. The method of claim 1, wherein the determining the primary portion comprises determining based on a type of the content to share.

3. The method of claim 1, wherein the determining the primary portion is recursive.

4. The method of claim 1, wherein the determining the primary portion is based on Machine Learning (ML) techniques.

5. The method of claim 1, wherein the determining the primary portion comprises determining based on an audio input.

6. The method of claim 1, further comprising:
   adjusting the content to share to generate a second adjusted content; and
   causing the second adjusted content to be displayed through a third device.

7. The method of claim 1, further comprising:
   generating a notification to a participant based on the primary portion of the content.

8. A system for adjusting content shared during communication sessions, comprising:
   a memory storing a set of instructions; and
   at least one processor configured to execute the instructions to:
   obtain, through a first device, an application to share, wherein the application includes at least one or more control functions configured to control at least one aspect of the application, wherein the application has a first window size;
   determine a primary portion of the application to share automatically, wherein the primary portion is a subset portion of the application excluding the at least one or more control functions, and wherein the primary portion of the application includes a content to share, and wherein the primary portion has a second window size that is smaller than the first window size;
   cropping the application to exclude the at least one or more control functions and leaving only the content to be shared, wherein the cropping is based on the primary portion, and wherein the cropping changes a window size of the application from the first size to the second window size; and
   cause the content within the subset portion of the application to be shared and displayed on a second device.

9. The system of claim 8, wherein the determining the primary portion comprises determining based on a type of the content to share.

10. The system of claim 8, wherein the determining the primary portion is recursive.

11. The system of claim 8, wherein the determining the primary portion is based on Machine Learning (ML) techniques.

12. The system of claim 8, wherein the determining the primary portion comprises determining based on an audio input.

13. The system of claim 8, further comprising:
    adjusting the content to generate a second adjusted content; and
    causing the second adjusted content to be displayed through a third device.

14. The system of claim 8, wherein further comprising:
    generating a notification to a participant based on the primary portion of the content.

15. A web-based server for recording, comprising:
    a memory storing a set of instructions; and
    at least one processor configured to execute the instructions to:
    obtain, through a first device, an application to share, wherein the application includes at least one or more control functions configured to control at least one aspect of the application, wherein the application has a first window size;
    determine a primary portion of the application to share automatically, wherein the primary portion is a subset portion of the application excluding the at least one or more control functions, and wherein the primary portion of the application includes a content to share, and wherein the primary portion has a second window size that is smaller than the first window size;
    cropping the application to exclude the at least one or more control functions and leaving only the content to be shared, wherein the cropping is based on the primary portion, and wherein the cropping changes a window size of the application from the first size to the second window size; and
    cause the content within the subset portion of the application to be shared and displayed on a second device.

16. The web-based server of claim 15, wherein the determining the primary portion comprises determining based on a type of the content to share.

17. The web-based server of claim 15, wherein the determining the primary portion is recursive.

18. The web-based server of claim 15, wherein the determining the primary portion is based on Machine Learning (ML) techniques.

19. The web-based server of claim 15, wherein the determining the primary portion comprises determining based on an audio input.

20. The web-based server of claim 15, further comprising:
    adjusting the content to generate a second adjusted content; and
    causing the second adjusted content to be displayed through a third device.

* * * * *